United States Patent [19]

Morris et al.

[11] Patent Number: 5,037,947

[45] Date of Patent: Aug. 6, 1991

[54] COPOLYESTERS FROM 4,4'-BIPHENYLDICARBOXYLIC ACID, 1,6-HEXANEDIOL AND 1,4-BUTANEDIOL

[75] Inventors: John C. Morris; Winston J. Jackson, Jr., both of Kingsport, Tenn.

[73] Assignee: Eastman Kodak Company, Rochester, N.Y.

[21] Appl. No.: 473,017

[22] Filed: Jan. 31, 1990

Related U.S. Application Data

[62] Division of Ser. No. 288,902, Dec. 23, 1988, Pat. No. 4,916,205.

[51] Int. Cl.$^5$ ............................................. C08G 63/20
[52] U.S. Cl. .................... 528/272; 528/274; 528/285; 528/286; 528/287; 528/293; 528/295; 528/300; 528/299; 528/302; 528/308; 528/308.6; 525/132; 525/437; 525/444; 525/445; 525/471; 525/905; 525/906
[58] Field of Search ............... 528/272, 274, 285, 286, 528/287, 293, 295, 300, 299, 302, 308, 308.6; 525/132, 437, 444, 445, 471, 905, 906

[56] References Cited

U.S. PATENT DOCUMENTS

| | | | |
|---|---|---|---|
| 2,657,194 | 10/1958 | Butler et al. | 528/301 |
| 2,976,266 | 3/1961 | Lytton et al. | 528/280 |
| 3,030,335 | 4/1962 | Goldberg | 528/85 |
| 3,190,764 | 6/1965 | Cardina | 427/333 |
| 3,247,043 | 4/1966 | Cardina | 156/314 |
| 3,317,466 | 5/1967 | Caldwell et al. | 528/190 |
| 3,709,489 | 1/1973 | Callander | 524/409 |
| 3,842,040 | 10/1974 | Browne et al. | 528/364 |
| 3,842,041 | 10/1974 | Browne et al. | 528/279 |
| 4,073,777 | 2/1978 | O'Neill et al. | 528/295 |
| 4,728,717 | 3/1988 | Morris et al. | 528/306 |
| 4,728,718 | 3/1988 | Morris et al. | 528/306 |
| 4,728,719 | 3/1988 | Morris et al. | 528/306 |
| 4,728,720 | 3/1988 | Morris et al. | 528/306 |
| 4,739,033 | 4/1988 | Morris et al. | 528/306 |
| 4,742,151 | 5/1988 | Tate et al. | 528/272 |

FOREIGN PATENT DOCUMENTS

1935252 7/1969 Fed. Rep. of Germany .

OTHER PUBLICATIONS

Derwent Abstract No. 314136 for JP 57198726A.
Chemical Abstracts, vol. 106, 1987, p. 14, JP 236821.
Meurisse et al., British Polymer Journal, vol. 13, 1981, p. 57.
Jackson et al., Journal of Applied Polymer Science, Applied Polymer Symposia, 41, 307-326 (1985).
Krigbaum et al., Journal of Applied Polymer Science, Polymer Letters Edition, 20, 109-115 (1982).
Krigbaum et al., Polymer, 24(10), pp. 1299-1307 (1983).
Watanabe et al., Macromolecules, 21(1), pp. 278-280 (1988).
Kobunshi Ronbunshu, vol. 44(12), 983-986 (Dec. 1987).

Primary Examiner—John Kight, III
Assistant Examiner—S. A. Acquah
Attorney, Agent, or Firm—Thomas R. Savitsky; Mark A. Montgomery; William P. Heath, Jr.

[57] ABSTRACT

Disclosed are copolyesters comprising an acid component of 4,4'-biphenyldicarboxylic acid and a glycol component comprising 1,6-hexanediol and 1,4-butanediol. The copolyesters exhibit unusually high tensile strengths.

12 Claims, No Drawings

COPOLYESTERS FROM 4,4'-BIPHENYLDICARBOXYLIC ACID, 1,6-HEXANEDIOL AND 1,4-BUTANEDIOL

This is a divisional of copending application Ser. No. 07/288,902 filed on 12/23/88. Now U.S. Pat. No. 4,916,205.

FIELD OF INVENTION

The present invention concerns copolyesters from 4,4'-biphenyldicarboxylic acid, 1,6-hexanediol and 1,4-butanediol that have unusually high tensile strengths.

BACKGROUND OF THE INVENTION

Homopolyesters of 4,4'-biphenyldicarboxylic acid and certain aliphatic glycols are disclosed in the literature. Homopolyesters of 4,4'-biphenyldicarboxylic acid and ethylene glycol, 1,4-butanediol, and 1,6-hexanediol are disclosed by Meurisse et al., in the *British Polymer Journal*, Volume 13, page 57 (1981) (Table 1). Jackson and Morris included a review of homopolyesters from 4,4'-biphenyldicarboxylic acid and various aliphatic glycols in the *Journal of Applied Polymer Science, Applied Polymer Symposia*, 41, 307–326 (1985). Krigbaum et al. disclose relatively low molecular weight homopolyesters from 4,4'-biphenyldicarboxylic acid and various aliphatic glycols in the *Journal of Applied Polymer Science, Polymer Letters Edition*, 20, 109–115 (1982). Low molecular weight homopolyesters of 4,4'-biphenyldicarboxylic acid are also disclosed by Wanatabe et al., *Macromolecules*, 21(1), p. 278–280 (1988), and Krigbaum et al., *Polymer*, 24(10), p. 1299–1307 (1983). Jpn. Kokai Tokkyo Koho JP 61,236,821 [86,236,821] (1986) also discloses low molecular weight polyesters from 4,4'-biphenyldicarboxylic acid and 1,4-butanediol prepared below their melting temperatures in a nonvolatile liquid. Polyesters of 1,6-hexanediol and 4,4'-biphenyldicarboxylic acid are disclosed in *Kobunshi Ronbunshu*, Vol. 44(12), 983–986 (December 1987) having limiting viscosity number of about 0.31.

U.S. Pat. No. 3,842,040 and U.S. Pat. No. 3,842,041 disclose the homopolyester of 4,4'-biphenyldicarboxylic acid and ethylene glycol.

Copolyesters of 4,4'-biphenyldicarboxylic acid (BDA) and certain aliphatic glycols are disclosed and ethylene glycol (EG), 1,4-butanediol (BD), 1,6-hexanediol (HD) are specifically disclosed in column 2, line 70 of U.S. Pat. No. 2,976,266 in a general listing along with other aliphatic glycols useful in this disclosed invention. However, the copolyester of BDA, BD, and HD is not specifically disclosed.

German Offenlegungsschrift, DE 1935252, discloses polyesters of two aromatic dicarboxylic acids which include 10 to 50 mol % 4,4-biphenyldicarboxylic acid, 50 to 90 mol % of terephthalic acid and the two glycols ethylene glycol and 1,4-cyclohexanedimethanol.

Japanese patent, Kokai Tokkyo Koho JP 57/198726 discloses copolyesters containing 25–80 mol % 4,4'-biphenyldicarboxylic acid with various aliphatic glycols and aromatic dicarboxylic acids.

U.S. Pat. No. 4,742,151 discloses ultra-high-molecular weight polyesters prepared from aromatic dicarboxylic acids and alkylene glycols containing from 2 to 6 carbons having an intrinsic viscosity greater than 1.5. 4,4'-Biphenyldicarboxylic acid is disclosed in a list of dicarboxylic acids useful to the disclosed invention.

Heretofore, copolyesters from 4,4'-biphenyldicarboxylic acid, 1,6-hexanediol, and 1,4-butanediol have been unknown.

SUMMARY OF THE INVENTION

The present invention is directed to a copolyester comprising
 (A) an acid component comprising repeating units of at least 80 mol % 4,4'-biphenyldicarboxylic acid, and
 (B) a glycol component comprising repeating units of from about 95–10 mol % 1,6-hexanediol, and about 5–90 mol % 1,4-butanediol,
wherein the total mol % of acid component and glycol component are each 100 mol %.

The present invention is also directed to a composition comprising:
 (i) about 30 to 99 weight percent of the copolyester of the invention, and
 (ii) about 1 to 70 weight percent of at least one property modifier.

DETAILED DESCRIPTION OF THE INVENTION

The prior art describes molding, spinning, and film extrusion as viable processes for shaping the polyesters based on 4,4'-biphenyldicarboxylic acid. We have discovered a range of polyester compositions within this broad disclosure based on 4,4'-biphenyldicarboxylic acid, 1,6-hexanediol, and 1,4-butanediol having exceptionally high tensile strength.

Injection-molded bars comprising at least 80 mol % 4,4'-biphenyldicarboxylic acid units, 10 to 95 mol % 1,6-hexanediol units, and 90 to 5 mol % 1,4-butanediol units have unexpectedly high tensile strength and typically have an inherent viscosity of at least about 0.6, or preferably about 0.8, or more. The homopolyester of 1,4-butanediol has a tensile strength of 8,500 psi. The homopolyester of 1,6-hexanediol (HD) with BDA has a tensile strength of 11,000 psi. Modification of either homopolyester with as little as 10 mol % of the coglycol nearly doubles tensile strength at low HD content and the copolyesters containing low 1,4-butanediol content also have substantially increased tensile strength.

In addition to excellent tensile strengths, the polyesters of our invention also have excellent solvent resistance. Molded bars are substantially unaffected after exposure for 24 hours in a variety of solvents which include toluene, 1,2-dichloroethane, methyl isobutyl ketone, ethyl acetate, ethanol, water, sulfuric acid, 10% sodium hydroxide, gasoline, acetone, acetic acid, 5% Clorox bleach, 50/50 water/ethanol, benzyl alcohol, nitric acid and methylene chloride.

The copolyesters of this invention are prepared from 4,4-biphenyldicarboxylic acid and/or its esters, 1,6-hexanediol, and 1,4-butanediol. Examples of useful aromatic esters are the dimethyl, diethyl, dibutyl, and diphenyl esters or any combination of mixed esters. The polyesters may be prepared from glycol esters of BDA. The polyesters may be prepared in the melt or in the solid phase or by a combination of these processes. In preferred copolyesters of the present invention the acid component is about 100 mol % of 4,4'-biphenyldicarboxylic acid.

It is also preferred that the glycol component is about 70–30 mol % 1,6-hexanediol and about 30–70 mol % 1,4-butanediol.

The acid portion of the polyesters of the present invention (component (A)) may be substituted with less than about 20 mol %, but preferably, less than about 10 mol % of other aromatic dicarboxylic acids having up to 20 carbon atoms. Examples of suitable aromatic dicarboxylic acids include terephthalic, isophthalic, 1,5-, 2,6-, 2,7-naphthalenedicarboxylic, or trans-4,4'-stilbenedicarboxylic acids.

Likewise, the glycol portion of the polyesters (component (B)) may be substituted with less than about 10 mol % of other aliphatic glycols having 2 to 20 carbon atoms so long as the high tensile strength remains substantially unaffected. Examples of useful glycols are 1,2-propanediol, 1,3-propanediol, 1,4-butanediol, 1,5-pentanediol, 1,6-hexanediol, and p-xylene glycol.

The copolyesters of the present invention preferably have tensile strengths of greater than 12,000 psi, more preferably greater than 15,000 psi.

In the composition of the present invention it is preferred that component (i) is present in an amount of about 50 to about 95 weight percent, and component (ii) is present in an amount of about 5 to about 50 weight percent.

In the composition of the present invention it is preferred that component (ii) is a property modifier selected from polyamides such as nylon 6,6 from Du Pont, poly(ether-imides) such as Ultem poly(etherimide) from General Electric, polyphenylene oxides such as poly(2,6-dimethylphenylene oxide) or poly(phenylene oxide)/polystyrene blends such as the Noryl resins from General Electric, polyesters, polyphenylene sulfides, polyphenylene sulfide/sulfones, poly(ester-carbonates), polycarbonates such as Lexan polycarbonates from General Electric, polysulfones, polysulfone ethers, and poly(ether-ketones) of aromatic dihydroxy compounds. The aromatic dihydroxy compounds used to prepare these polymers are disclosed in, for example, U.S. Pat. Nos. 3,030,335 and 3,317,466.

Component (ii) of the composition of this invention may also be conventional flame retardants such as a phosphorus compound, a halogen compound, or a halogen compound in combination with an antimony compound, or fillers such as talc or mica, or reinforcing agents such as glass fiber, Kevlar (poly(1,4-phenylene terephthalamide)), or carbon fiber.

It is preferred that the copolyester and/or composition of the present invention is in the form of a fiber, a film, a container, or a molded object.

The following examples are to illustrate the invention but should not be interpreted as a limitation thereon.

Inherent viscosities (I.V.) are determined at 25° C. in 25/35/40 (wt./wt./wt.) phenol/teterachloroethane/p-chlorophenol at a concentration of 0.1 gram (g)/100 milliliters (mL). The melting points of the copolyesters are determined using a Perkin-Elmer DSC 2B Differential Scanning Calorimeter at a scan rate of 20° C./minute. Compositions are determined using proton nuclear magnetic resonance spectroscopy (NMR).

The polyesters are ground to pass a 3-millimeter (mm) screen, dried at 100° C. in a vacuum oven for 24 hours, and injection molded on a 1-ounce (oz) Watson-Stillman molding machine to give 1/16-inch (in.) thick D1822 Type L tensile bars. The tensile strength is determined following the procedure of ASTM D638.

EXAMPLE 1

This example illustrates the preparation of the copolyester consisting of 100 mol % 4,4'-biphenyldicarboxylic acid units, and 73 mol % 1,6-hexanediol units, and 27 mol % 1,4-butanediol units.

A mixture of 202.5 g (0.75 mol) dimethyl 4,4'-biphenyldicarboxylate, 85.0 g (0.72 mol) 1,6-hexanediol, 27.0 g (0.30 mol) 1,4-butanediol, and 0.14 g titanium tetraisopropoxide is placed in a 1-liter flask equipped with an inlet for nitrogen, a metal stirrer, and a short distillation column. The flask is heated at 200° C. for about 3 hours, at 240° C. for about 0.25 hours, and finally at 260° C. for about 0.5 hour. A vacuum of 0.5 mm is gradually applied over the next 5 minutes as the temperature is raised to 270° C. Full vacuum is maintained for about 10 minutes. A high melt viscosity, white crystalline polymer is obtained with an I.V. of 1.22 and a melting point of 175° C.

The polymer is injection molded at 220° C. to give tensile bars with 13,800 pounds per square inch (psi) tensile strength.

The other examples in Table 1 are prepared and injection molded in a similar manner. The copolyesters of Table 1 have an acid component of 100 mol % BDA.

TABLE 1

Effect of Composition on the Tensile Strength of 4,4'-Biphenyldicarboxylic Acid/1,6-Hexanediol/-1,4-Butanediol Copolyesters

| HD, Mol % | BD Mol % | DSC Tm, °C.$^a$ | Molding Temp., °C.$^b$ | Molding I.V., Before | Molding I.V., After | Tensile Strength, psi |
|---|---|---|---|---|---|---|
| 100$^c$ | 0 | 217 | 210 | 1.14 | 1.11 | 10000 |
| 100$^c$ | 0 | 217 | 240 | 1.14 | 1.04 | 11300 |
| 95 | 5 | 210 | 210 | 1.19 | 1.19 | 19100 |
| 92 | 8 | 197 | 240 | 1.13 | 1.01 | 11800 |
| 90 | 10 | 202 | 210 | 1.23 | 1.22 | 21600 |
| 73 | 27 | 175 | 220 | 1.22 | 1.27 | 13800 |
| 75 | 25 | 176 | 240 | 1.36 | 1.25 | 12000 |
| 53 | 47 | 176 | 250 | 1.57 | 1.47 | 14400 |
| 52 | 48 | 179 | 240 | 1.65 | 1.53 | 18400 |
| 32 | 68 | 236 | 260 | 1.25 | 1.17 | 16700 |
| 26 | 74 | 250 | 240 | 1.40 | 1.23 | 17000 |
| 12 | 88 | 276 | 300 | 1.80 | — | 9800 |
| 9 | 91 | 282 | 260 | 1.65 | 0.92 | 16100 |
| 0 | 100 | 295 | 280 | 1.14 | 0.80 | 6300 |

$^a$Melting point in °C. as determined by Differential Scanning Calorimetry.
$^b$The molding temperature is the set temperature of the last two zones of the Boy 22S molding machine. The actual melt temperatures are about 20–30° C. above the indicated molding temperatures.
$^c$The I.V. of this polymer is equivalent to that prepared by Meurisse in the Brit. Poly. J., Vol. 13, p. 57 (1981).

The invention has been described in detail with particular reference to preferred embodiments thereof, but it will be understood that variations and modifications can be effected within the spirit and scope of the invention.

We claim:

1. A composition comprising:
   (i) about 30 to 99 weight percent of the copolyester comprising
      (A) an acid component comprising repeating units of at least 80 mol % 4,4'-biphenyldicarboxylic acid, and
      (B) a glycol component comprising repeating units of from about 95–10 mol % 1,6-hexanediol, and about 5–90 mol % 1,4-butanediol, wherein the total mol % of acid component and glycol component are each 100 mol % and
   (ii) about 1 to 70 weight percent of at least one property modifier.

2. The composition of claim 1 wherein component (i) is present in an amount of about 50 to about 95 weight percent, and component (ii) is present in an amount of about 5 to about 50 weight percent.

3. A composition comprising:
(i) about 30 to 99 weight percent of a copolyester comprising
(A) an acid component comprising repeating units of at lest 80 mol % 4,4'-biphenyldicarboxylic acid, and
(B) a glycol component comprising repeating units of from about 95-10 mol % 1,6-hexanediol, and about 5-90 mol % 1,4-butanediol, wherein the total mol % of acid component and glycol component are each 100 mol % and
(ii) about 170 weight percent of at least one property modifier selected from the group consisting of 6,6-nylon, a poly(ether-imide), a polyphenylene oxide, a polyphenylene oxide/polystyrene blend, a different polyester, a polyphenylene sulfide, a polyphenylene sulfide/sulfone blend, a poly(ester-carbonate), a polycarbonate, a polysulfone ether, a poly(etherketone) of aromatic dihydroxy compounds, a phosphorus compound, a halogen compound, a halogen compound in combination with an antimony compound, talc, mica, poly(1,4-phenylene terephthalimide), a glass fiber, and a carbon fiber.

4. The composition of claim 2 wherein the acid component of the copolyester is about 100 mol % of 4,4'-biphenyldicarboxylic acid.

5. The composition of claim 2 wherein the glycol component of the copolyester is about 70-30 mol % 1,6-hexanediol and about 30-70 mol % 1,4-butanediol.

6. The composition of claim 4 wherein the glycol component of the copolyester is about 50 mol % 1,6-hexanediol and about 50 mol % 1,4-butanediol.

7. The composition of claim 2 wherein the copolyester has an inherent viscosity of at least about 0.6 determined at 25° C. in 25/35/40 (wt./wt./wt.) phenol/tetrachloroethane/p-chlorophenol at a concentation of 0.1 g./100 ml.

8. The composition of claim 2 wherein the copolyester has an inherent viscosity of at least about 0.8 determined at 25° C. in 25/35/40 (wt./wt./wt.) phenol/tetrachloroethane/p-chlorophenol at a concentration of 0.1 g./100 ml.

9. The composition of claim 2 wherein the acid component of the copolyester comprises at least about 90 mol % 4,4'-biphenyldicarboxylic acid and less than about 10 mol % of at least one other aromatic dicarboxylic acid having 8 to 20 carbon atoms; and the glycol component comprises less than about 10 mol % of at least one other aliphatic glycol having 2 to 20 carbon atoms.

10. The composition of claim 9 wherein said other dicarboxylic acid is terephthalic acid, isophthalic acid, 1,5-naphthalenedicarboxylic acid, 2,6-naphthalenedicarboxylic acid, 2,7-naphthalenedicarboxylic acid, or trans-4,4'-stilbenedicarboxylic acid; and said other aliphatic glycol is 1,2-propanediol, 1,3-propanediol, 1,5-pentanediol, or p-xylene glycol.

11. The composition of claim 2 wherein the copolyester has a tensile strength of greater than about 12,000 psi.

12. The composition of claim 12 wherein the copolyester has a tensile strength of greater than about 15,000 psi.

* * * * *